(12) United States Patent
Tanatsugu et al.

(10) Patent No.: US 6,301,928 B1
(45) Date of Patent: Oct. 16, 2001

(54) METHOD FOR IMPROVING THE PERFORMANCE OF A CRYOGENIC HEAT EXCHANGER UNDER FROSTING CONDITIONS

(75) Inventors: Nobuhiro Tanatsugu; Kenya Harada, both of Sagamihara (JP)

(73) Assignee: The Director-General of the Institute of Space and Astronautical Science, Sagamihara (JP)

( * ) Notice: Subject to any disclaimer, the term of this patent is extended or adjusted under 35 U.S.C. 154(b) by 0 days.

(21) Appl. No.: 09/345,480

(22) Filed: Jul. 1, 1999

(30) Foreign Application Priority Data

Apr. 15, 1999 (JP) .................................................. 11-107801

(51) Int. Cl.$^7$ ....................................................... F25J 1/00
(52) U.S. Cl. .................................. 62/633; 62/637; 165/60
(58) Field of Search .............................. 62/46.1, 93, 633, 62/637; 165/60

(56) References Cited

U.S. PATENT DOCUMENTS

| | | | |
|---|---|---|---|
| 3,330,124 | * 7/1967 | Marshall | 62/633 |
| 3,387,462 | * 6/1968 | Bauger et al. | 62/46.1 |
| 3,403,522 | * 10/1968 | Henry | 62/633 |
| 3,557,557 | * 1/1971 | Prachar | 62/93 |
| 5,203,161 | 4/1993 | Lehto | 60/39.53 |
| 5,408,835 | 4/1995 | Anderson | 62/82 |
| 5,806,298 | 9/1998 | Klosek et al. | 60/39.06 |

FOREIGN PATENT DOCUMENTS 2 241 536   9/1991 (GB) .

OTHER PUBLICATIONS

Patent Abstracts of Japan, vol. 007 No. 007 (C–144), Jan. 12, 1983, JP 57 165017, Oct. 9, 1982.
Patent Abstracts of Japan, vol. 013, No. 336 (C–623), Jul. 27, 1989, JP 01 115432, May 8, 1989.

* cited by examiner

*Primary Examiner*—Ronald Capossela
(74) *Attorney, Agent, or Firm*—Oblon, Spivak, McClelland, Maier & Neustadt, P.C.

(57) ABSTRACT

The present invention provides a method for preventing the decrease of the efficiency of heat transfer, caused by frost formation, in a precooler of an air breathing engine. In the precooler, the heat exchanger tube is provided. Into the heat exchanger tube, liquid hydrogen serving as a coolant is supplied. The main air flow is sent to the precooler via the intake duct, and the main air flow which is cooled down there, is then sent to a compressor of the air breathing engine. Via the nozzle provided in the middle of the intake duct, ethanol is mixed into the main air flow. Ethanol is carried into the precooler, and condenses together with the water vapor on the surface of the heat exchanger tube. A frost layer thus formed has less cavities and low thermal resistance as compared to that formed when the water vapor condenses solely. Therefore, the decrease of the performance of the heat exchanger, which is caused by the frost formation, can be prevented.

5 Claims, 3 Drawing Sheets

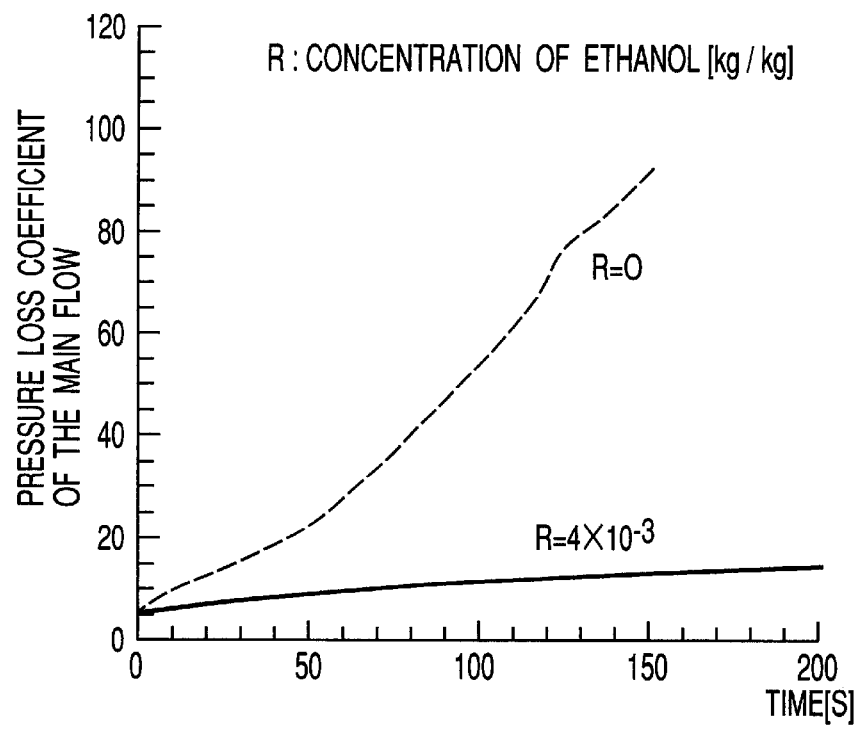
FIG. 2 TIME VARIATION OF THE PRESSURE LOSS COEFFICIENT (TEMPERATURE OF THE HEAT TRANSFER SURFACE: 90K)
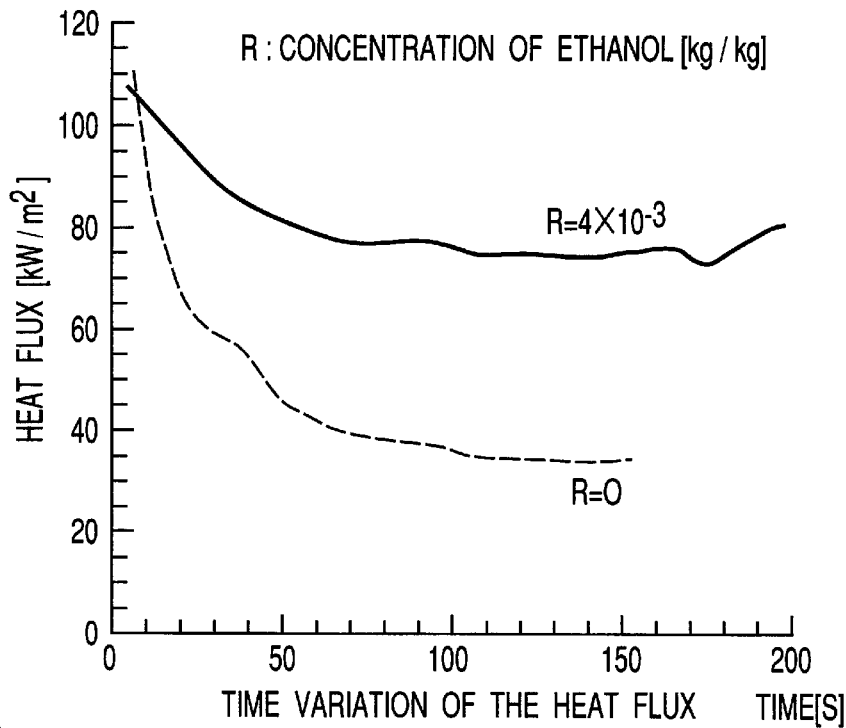
FIG. 3 TIME VARIATION OF THE HEAT FLUX (TEMPERATURE OF THE HEAT TRANSFER SURFACE: 90K)

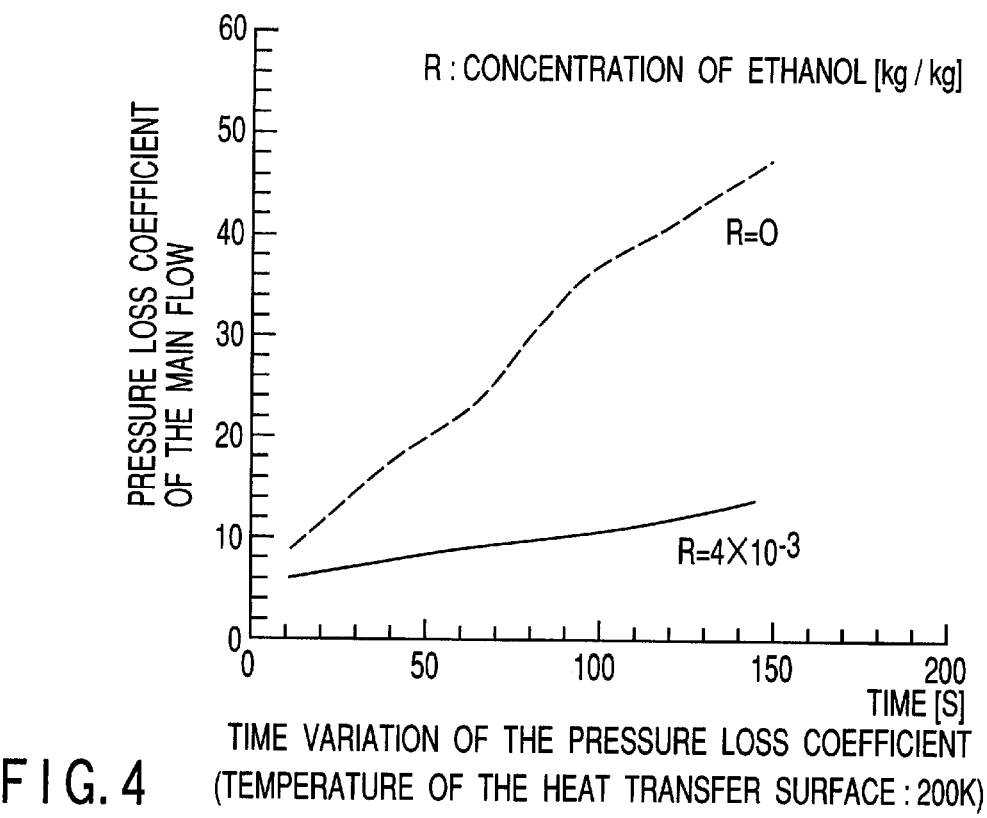
FIG. 4 TIME VARIATION OF THE PRESSURE LOSS COEFFICIENT (TEMPERATURE OF THE HEAT TRANSFER SURFACE: 200K)
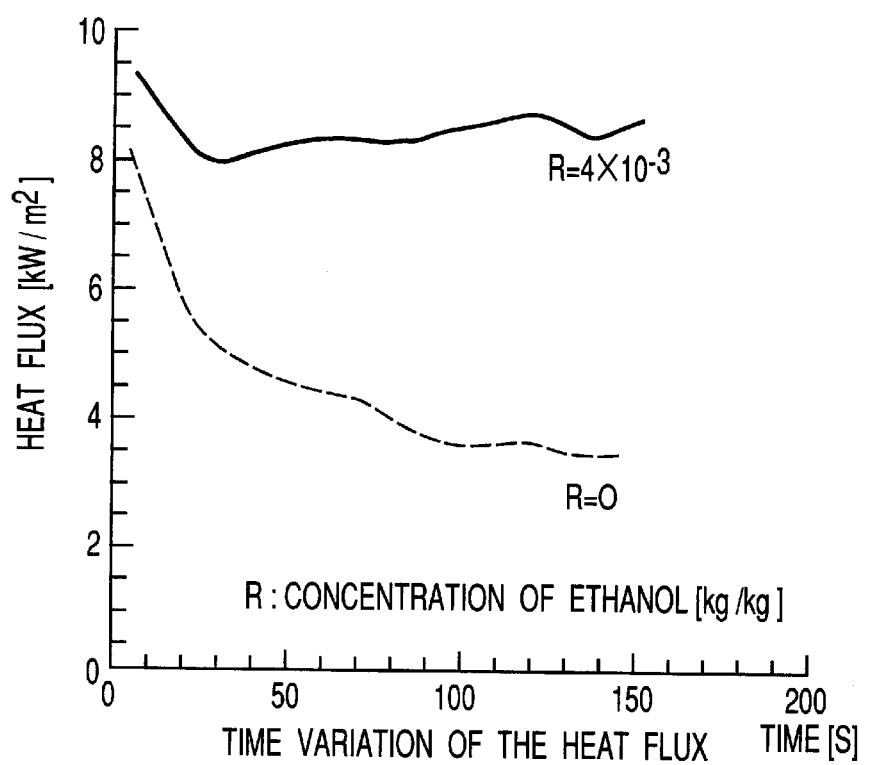
FIG. 5 TIME VARIATION OF THE HEAT FLUX (TEMPERATURE OF THE HEAT TRANSFER SURFACE: 200K)

METHOD FOR IMPROVING THE PERFORMANCE OF A CRYOGENIC HEAT EXCHANGER UNDER FROSTING CONDITIONS

BACKGROUND OF THE INVENTION

The present invention relates to a method for improving the performance of a cryogenic heat exchanger under frosting conditions, and more specifically to a method suitable for a precooler of an air breathing engine.

In order to realize a liquid air cycle engine or a precooled turbojet engine, the development of a high-performance precooler is a key technology. The foremost concern in the development of such a precooler is frost formation on the heat transfer surface of the heat exchanger.

When frost is formed on a heat transfer surface, the efficiency of heat transfer decreases due to the thermal resistance of the frost layer. Further, the flow path of the main air flow narrows, and the pressure loss of the flow increases. The frost layer formed on the heat transfer surface in a cryogenic state has a low density and a low thermal conductivity, and therefore the performance of the heat exchanger is greatly influenced.

In case of the precooler of an air breathing engine used for a space craft, the frost formation creates a trouble particularly when it is flying at low altitude, which is in the acceleration phase. During this period (about several tens to several hundreds of seconds), the operation of the engine cannot be stopped. Therefore, a defrosting cycle, which is applicable in the heat exchanger used for refrigeration or air-conditioning, cannot be applied.

BRIEF SUMMARY OF THE INVENTION

The present invention has been proposed in consideration of the above-described problem, and the object thereof is to provide a method for preventing the decrease of the efficiency of heat transfer, due to frost formation on a heat transfer surface in a cryogenic heat exchanger under frosting conditions, such as a precooler of an air breathing engine.

According to the method of the present invention, into a flow of a gas to be cooled which contains a frost formation material, condensable gas having a melting point lower than that of the frost formation material is mixed at the upstream side of the heat exchanger, and thus the condensable gas is condensed or sublimated together with the frost formation material on the heat transfer surface.

The frost layer thus formed contains a condensed liquid form or sublimated solid form of the condensable gas. Therefore, as compared to the frost layer formed when the frost formation material is condensed solely, this frost layer contains less cavities and has a high density. Therefore, as the cavities decrease, the thermal resistance of the frost layer is reduced. Further, as the thickness of the frost layer decreases in accordance with the reduction of cavities, the flow resistance of the gas to be cooled decreases. Consequently, it becomes possible to prevent the decrease of the performance of heat exchanger, which might be caused by the frost formation.

It should be noted that in order to have the condensable gas condensed or sublimated in about the same amount as that of the frost formation material, it is necessary that the difference in the concentration of saturated vapor of the condensable gas between the temperature of the main flow and that of the heat transfer surface, should be larger than the amount of the frost formation material contained in the main flow. Here, an increase in the necessary amount of the condensable gas thus mixed is not practically advantageous, the concentration of saturated vapor itself should be small preferably. In the case where the cryogenic heat exchanger is a precooler of an air breathing engine, the gas to be cooled is air, and the frost formation material is water vapor. In this case, examples of the condensable gas which satisfies the above conditions, are hydrocarbons of a molecular weight of 90 to 120 (toluene, n-heptane, ethylbenzene, n-octane, isooctane), lower alcohols having 3 or less carbon atoms (methanol, ethanol, propanol), and ethyl acetate.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a graph showing the time variation of the pressure loss coefficient of the main air flow in a single row heat exchanger model when the temperature of the heat transfer surface is 90K;

FIG. 3 is a graph showing the time variation of the heat flux in a single row heat exchanger model when the temperature of the heat transfer surface is 90K;

FIG. 4 is a graph showing the time variation of the pressure loss coefficient of the main air flow in a single row heat exchanger model when the temperature of the heat transfer surface is 200K; and FIG. 5 is a graph showing the time variation of the heat flux in a single row heat exchanger model when the temperature of the heat transfer surface is 200K.

DETAILED DESCRIPTION OF THE INVENTION

Figure 1:
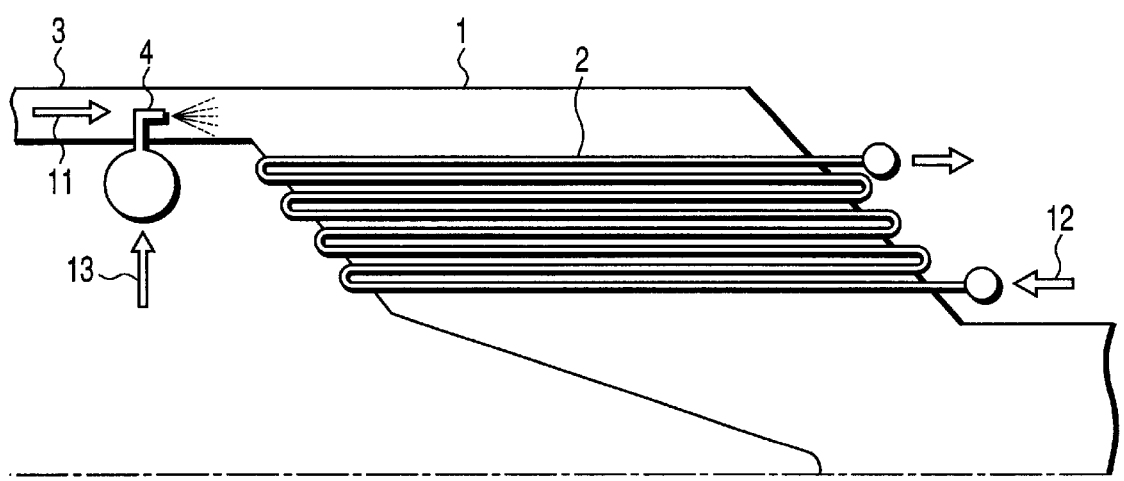
FIG. 1 is a schematic diagram of the method for improving the performance of a cryogenic heat exchanger, according to the present invention, when it is applied to a precooler of an air breathing engine.

FIG. 1 is a schematic diagram illustrating the method for improving the performance of a cryogenic heat exchanger, according to the present invention, when it is applied to a precooler of an air breathing engine. The figure includes a precooler 1, a heat exchanger tube 2 (heat transfer surface), an intake duct 3, a nozzle 4, main air flow 11 (gas to be cooled), liquid hydrogen 12 (coolant) and ethanol 13 (condensable gas).

In the precooler for supplying precooled main air flow to the air breathing engine (not shown), a heat exchanger tube 2 is provided. Into the heat exchanger tube 2, liquid hydrogen 12 serving as a coolant is supplied. The main air flow 11 is sent to the precooler 1 via the intake duct 3, and the main air flow which is cooled down there, is sent to a compressor of the air breathing engine.

In the middle of the intake duct 3, a nozzle 4 is provided, through which ethanol 13 is mixed into the main air flow 11.

Ethanol 13 mixed therein is carried on the flow of the main air flow 11 into the precooler 1, and condenses (or sublimates) together with water vapor on the surface of the heat exchanger tube 2 (or within the frost layer already deposited on the heat transfer surface). The frost layer thus formed contains less cavities and has a high density, as compared to the frost layer formed when the water vapor is condensed solely. Therefore, as the cavities decrease, the thermal resistance of the frost layer is reduced. Further, as the thickness of the frost layer decreases in accordance with the reduction of cavities, the flow resistance decreases. Consequently, it becomes possible to prevent the decrease of the performance of the heat exchanger, which might be caused by the frost formation.

It should be noted that the amount of ethanol mixed is set so that the concentration of ethanol in the main air flow 11 becomes equal to or higher than the saturation point at the temperature of the heat transfer surface of the heat exchanger tube 2.

FIGS. 2 to 5 illustrate the time variations of the pressure loss coefficient and the heat flux in the case where the method of the present invention is applied to a single row heat exchanger model (having an outer diameter of the heat exchanger tube of 8 mm and a pitch of 12 mm) in various cases. In these experiments, the flow rate of the main air flow was set to 3 m/s, the temperature of the main air flow was set to 293° C. and the concentration of the water vapor in the main air flow was set to $4 \times 10^{-3}$ kg/kg. Further, the amount of ethanol mixed into the main air flow was 4 g per 1 kg of air. In these figures, the results for the case where no ethanol was mixed were also indicated, for comparison.

FIG. 2 is a graph showing the time variation of the pressure loss coefficient of the main air flow when liquid nitrogen was used as the coolant and the temperature of the heat transfer surface was 90K. FIG. 3 illustrates the time variation of the heat flux in the case shown in FIG. 2. As can be seen from the figures, with ethanol mixed into the main air flow, an increase in the pressure loss of the main air flow and a decrease in the heat flux, which is cased by the frost formation, are significantly suppressed as compared to the conventional case where no ethanol was mixed.

FIG. 4 illustrates the time variation of the pressure loss coefficient of the main air flow when low-temperature nitrogen gas was used as the coolant and the temperature of the heat transfer surface was 200K. FIG. 5 illustrates the time variation of the heat flux in the case shown in FIG. 4. Similar to the above-described case, with ethanol mixed into the main air flow, an increase in the pressure loss of the main air flow and a decrease in the heat flux, which is caused by the frost formation, are significantly suppressed as compared to the conventional case.

As described above, it has been confirmed that with the method of the present invention, the performance of the cryogenic heat exchanger is remarkably improved both in the case where the temperature of the heat transfer surface (90K; FIG. 2, FIG. 3) is lower than the melting point of ethanol (159K), and in the case where the temperature of the heat transfer surface (200K; FIG. 4, FIG. 5) is higher.

According to the method of the present invention, as the density of the frost layer formed on the heat transfer surface increases, the efficiency of the cryogenic heat exchanger is improved and the pressure loss of the main flow of the gas to be cooled is decreased. The method of the present invention can be carried out by only mixing a very small amount of condensable gas into the flow of a gas to be cooled, and therefore it can be realized with a relatively simple structure.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method for improving performance of a cryogenic heat exchanger under frosting conditions, wherein into a flow of a gas to be cooled which contains a frost formation material, a condensable gas having a melting point lower than that of the frost formation material is mixed at the upstream side of a heat exchanger, and thus the condensable gas is condensed forms a sublimated solid gas together with the frost formation material on the heat transfer surface.

2. A method according to claim 1, wherein the gas to be cooled is air, the frost formation material is water vapor, and the condensable gas is one of hydrocarbons having a molecular weight of 90 to 120, lower alcohols having 3 or less carbon atoms, and ethyl acetate.

3. A method according to claim 2, wherein the condensable gas is ethanol.

4. A precooler of an air breathing engine, comprising:
an intake duct through which air which contains a frost formation material is configured to flow into the precooler;
a heat exchanger having a heat transfer surface and provided downstream of the intake duct; and
a nozzle provided in the intake duct upstream of the heat exchanger, the nozzle being configured to mix condensable gas which is one of hydrocarbons having a molecular weight of 90 to 120, lower alcohols having 3 or less carbon atoms, and ethyl acetate into the air such that the condensable gas condenses together with the frost formation material on the heat transfer surface.

5. A precooler of an air breathing engine, comprising:
an intake duct through which air which contains a frost formation material is configured to flow into the precooler;
a heat exchanger having a heat transfer surface and provided downstream of the intake duct; and
a nozzle provided in the intake duct upstream of the heat exchanger, the nozzle being configured to mix ethanol into the air such that the ethanol condenses together with the frost formation material on the heat transfer surface.

* * * * *